United States Patent [19]

Boler

[11] Patent Number: 4,972,620
[45] Date of Patent: Nov. 27, 1990

[54] AERODYNAMIC MOVABLE WILD GAME DECOY

[76] Inventor: Curtis Boler, 2239 Briar West, Houston, Tex. 77077

[21] Appl. No.: 430,509

[22] Filed: Nov. 1, 1989

[51] Int. Cl.⁵ .............................................. A01M 31/06
[52] U.S. Cl. ............................................................ 43/3
[58] Field of Search ........................................... 43/2, 3

[56] References Cited

U.S. PATENT DOCUMENTS

| | | | |
|---|---|---|---|
| 1,062,713 | 5/1913 | Johnson | 43/3 |
| 1,718,384 | 6/1929 | Sherman | 43/3 |
| 2,395,247 | 2/1946 | Buffenbarger | 43/3 |
| 2,450,572 | 10/1948 | Ballard | 43/3 |
| 2,466,626 | 4/1949 | Valasek | 43/3 |
| 2,947,104 | 8/1960 | Johnson | 43/3 |
| 4,062,141 | 12/1977 | Shjeflo | 43/3 |
| 4,172,335 | 10/1979 | Farmer | 43/3 |
| 4,251,937 | 2/1981 | Curley | 43/3 |
| 4,318,240 | 3/1982 | Hillesland | 43/3 |
| 4,334,643 | 6/1982 | Farmer | 43/3 |
| 4,475,674 | 10/1984 | Farmer | 43/3 |
| 4,611,421 | 9/1986 | Jacob | 43/3 |
| 4,753,028 | 6/1988 | Farmer | 43/3 |

FOREIGN PATENT DOCUMENTS 712760 7/1965 Canada .................................. 43/3

*Primary Examiner*—Kurt Rowan

[57] ABSTRACT

An improved wild game decoy which uses aerodynamics to simulate life-like movement of wild game birds. The mounting stake allows for placing decoys in feeding or sentinel (guard) positions without changing decoy heads or using another decoy. The decoy can easily be transformed int a water buoyant decoy with the insertion of a flotation device. The present invention is inexpensive, stackable in assembled form and simulates real wild bird movement.

2 Claims, 5 Drawing Sheets

AERODYNAMIC MOVABLE WILD GAME DECOY

FIELD OF THE INVENTION

The field of the present invention is fishing, trapping and vermin destroying. Specifically, the present invention is directed to a wild game decoy which is stackable and simulates real wild bird movement by use of aerodynamics as well as being easily adapted from a land decoy to a buoyant decoy.

BACKGROUND OF THE INVENTION

Decoys have been used by hunters to coax wild birds into firing range for years. The average hunter adds 50-200 decoys to his spread per year and there is a need for an inexpensive, easily transportable, life-like movable decoy. The decoys currently available on the market are lacking in several areas: Stackability in their assembled configurations, having to use two separate heads or decoys for feeding and sentinel positions, life-like movement and ability to convert land decoys to water buoyant decoys easily and quickly.

For explanation purposes, the example of geese will be used even though the present invention is for all wild game birds.

Geese fly, land and feed into the wind. Because they land in the back of or behind a spread of already grounded geese, they need to see what appears to be a life-like bird as they approach.

Other decoys are known and some are described hereinafter. U.S. Pat. #4,062,141, Shjeflo teaches a decoy with a flexible wind sock body construction which inflates, when directed into the wind, and gives the appearance of a real duck or goose. Experience with this particular invention shows the decoy is not stackable, does not work well in reduced winds and is considerably more expensive than other decoys.

U.S. Pat. #4,172,335, Farmer teaches a decoy shaped as a partial conical structure for the decoy body and a head shaped stake for assembly of two sections and mounting into the ground. The decoys have to be disassembled for carrying and the hunter is required to have two separate head stakes for feeding and sentinel positions. The decoy is designed to have one stationary position and the head stake is designed to have almost no depth which makes it virtually invisible to an approaching bird. The rear portion of the decoy is open and again virtually impossible to be seen by an approaching bird. This decoy is also not adaptable to water use.

U.S. Pat. #4,318,240, Hillesland teaches a decoy made to resemble a three dimensional structure. The decoy is not stackable in an assembled position, is mounted directly to the ground and is not designed for any type of movement. This one also is not adaptable to water use.

None of the prior art found simulates real bird movement; they do not adapt easily to land and water and they are not as easily transportable in their assembled configurations as the present invention.

SUMMARY OF THE INVENTION

The present invention is directed to a wild game decoy which most accurately simulates a real bird. This decoy can be manufactured and sold inexpensively from preferably a flat sheet of element resistant, durable material cut on a rolling die and printed or silk screened with real wild game bird markings. The decoy is a monolithical structure with a head portion which is flat so as to be seen easily by flying birds, shoulder portions and vertical slits emanating from the monolithical structure which define two wings and a tail portion. Said monolithical structure being of such shape and design that when assembled, resembles a wild game bird and reacts with wind movement. At the base or beginning point of the vertical slits are small relief holes which aid in the bending and flexing of the material to secure into the shape of the desired decoy.

The present invention assembles easily with tension retaining fasteners cooperating with corresponding openings including relief holes to complete the engagement. The decoy of the present invention includes three points of assembly; the shoulder portions have dual fasteners and each wing portion assembles to the tail portion. One shoulder portion includes dual tension retaining fasteners which co-act with dual cooperating openings located on the opposite shoulder portion. Openings are designed with small relief holes on either end of the openings for the purpose of bending and flexing the material into shape.

Above assembly completed, an opening in the chest area remains to allow for air passage, thus allowing the decoy to move in a life-like fashion when placed on a mounting stake.

Each wing portion also includes a tension retaining fastener which co-acts with cooperating openings located in the tail portion of the decoy. Said openings including relief holes located on either end of said openings to aid in bending and flexing of the material. This assembly gives the decoy a real bird appearance with definite wing and tail portions.

A great deal of study was done to develop this decoy for air movement. Movement is accomplished with as little as a two mile per hour breeze.

When the decoys are placed facing the wind, air passes through the opening in the chest area beneath the head portion, bounces off the underside of the decoy, follows air guides which are created by the vertical slits as discussed earlier, and deflects out the wing area on either side of the tail portion. This action gives the decoy a side to side or walking movement.

Another feature of the decoy involves head movement. The head is flat and shaped to resemble a birds' head which makes it easily visible to approaching birds. By adjusting the mounting stake, the hunter can achieve a feeding or sentinel position; and there is no need for two separate heads or decoys. If the stake is placed at a 30° angle, the head appears to be in a feeding position. When the wind blows, the head, because of aerodynamic design, moves upward and downward. At the same time, the tail moves in the opposite directions.

When the decoy is placed at a 70° angle, the head appears to be in a sentinel or guard position. When the wind blows, the head moves upward and downward, giving the decoy a life-like effect.

The head movement in combination with the side to side movement produced by the body creates a very real appearance.

The mounting stake is also very important. Its particular shape is designed to not be seen by approaching birds. It is of such length as to hold decoy off the ground to achieve the best reaction to wind for movement. Said mounting stake has a longitudinal slit which enables mounting to the decoy by simply sliding it onto the assembled chest area of the decoy. The mounting stake is a monolithical structure with a sharp end for easy ground penetration. The mounting stake in part is circular in shape with said longitudinal slit equally dividing but not separating the circular portion. The other portion of the stake is a cross-section of the circular portion with a sharp end for ground penetration. Because decoys are faced into the wind, the wind itself helps keep the decoy secured to the mounting stake.

A one-piece wing spread may be added to the present invention by attaching the wing spread through openings in the top portion of the decoy. This wing spread may be attached to the present invention and mounted higher off the ground to give the appearance of birds approaching a spread.

During production, two sets of holes may be placed into the decoy blank at such points as to enable insertion of flotation devices in order to convert the present invention from land decoy to water buoyant decoy. Two flotation devices may be required to keep the decoy properly balanced. The two sets of holes may be symmetrically placed so as to allow the flotation devices to snap into place. The flotation devices are preferably made of a polystyrene or like material with pin-like members on either end of said flotation devices for engagement into said sets of holes. The pin-like members may include a groove-like indention for a more definite fit. The front flotation device may be used in cooperation with an anchoring means to keep the decoy in place.

Another feature of the present invention is the ability to easily and quickly disassemble the decoy for flat storage for use in the next season.

The features discussed above outline the many advantages and novelty of the present invention.

An object of the present invention is to provide an improved, light-weight decoy that may be stacked and transported easily in its assembled configuration.

Another object of the present invention is to provide an inexpensive, novel decoy which incorporates the sentinel and feeding positions of wild birds into one embodiment.

Another object of the present invention is to provide a versatile decoy that can easily be converted from a land decoy to a water decoy and back again by using a pair of flotation devices.

Another object of the present invention is to provide a unique and novel mounting stake which allows for positioning the decoy of the present invention in various positions while securing it to the ground as well as aiding in the aerodynamic movement of said decoy.

Yet another object of the present invention is to provide the most life-like decoy by use of aerodynamic design to simulate actual wild bird movement.

DESCRIPTION OF THE PREFERRED EMBODIMENT

Figure 7A:
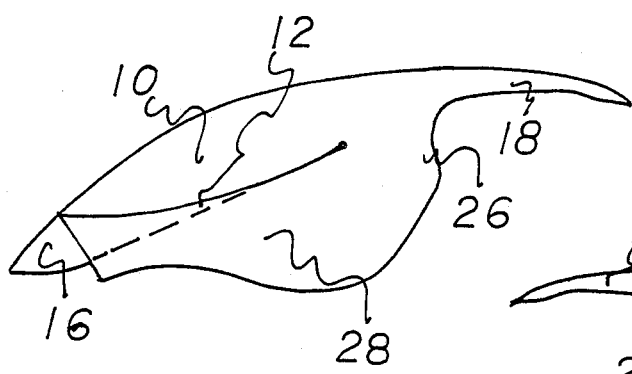
FIGS. 7A and 7B are side views of the assembled decoy of the present invention.
Figure 7B:
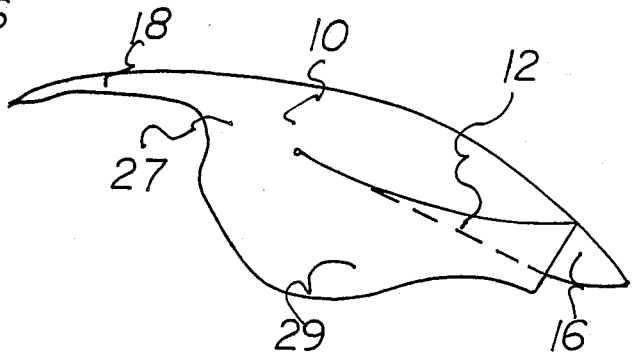
Figure 8:
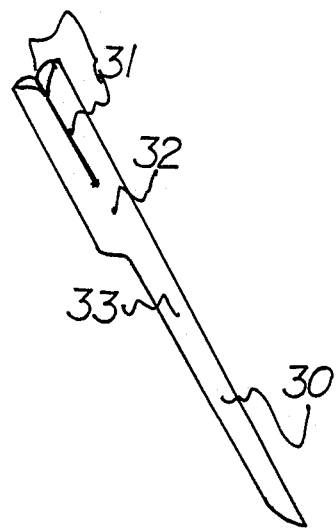
FIG. 8 is an illustrative view of the mounting stake of the present invention showing the longitudinal slit used for mounting the decoy.

Referring now to the detailed drawings, FIGS. 1-7 show the assembly of the present invention from a flat, monolithical structure 10 of an element resistant, light-weight material, to an aerodynamically designed life-like wild game decoy as illustrated in FIG. 7.

Figure 1:
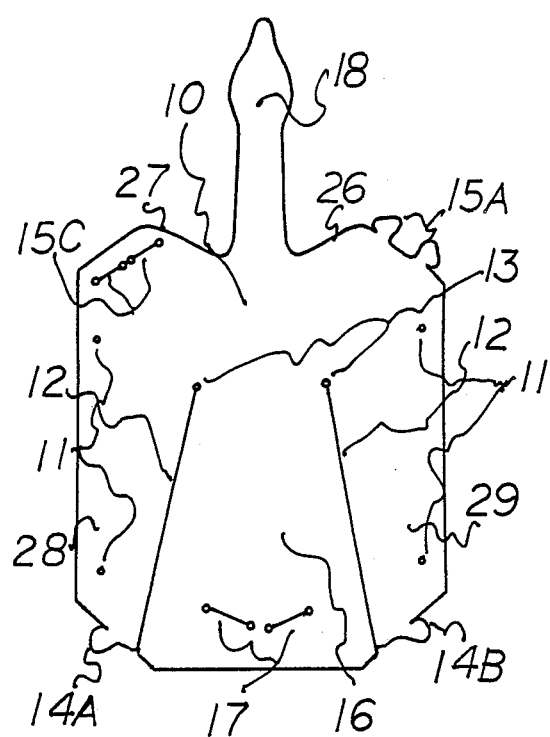
FIG. 1 is a flat decoy blank in accordance with the present invention illustrating the design, vertical slits and fastening means.

The decoy blank 10 in FIG. 1 illustrates the one-dimensional flat, bird-shaped head portion 18 which blends into two shoulder portions 26 and 27.

One shoulder portion 26 has located on its uppermost area, two tension retaining fasteners 15a. The opposite shoulder portion 27 has corresponding openings with relief holes 15c to be used in cooperation with the tension retaining fasteners 15a so as to secure the decoy in assembled position.

Following down the body of the decoy blank 10 are two vertical slits 12 which emanate from just above the center of said decoy blank 10. Said vertical slits 12 have small relief holes 13 at their starting point. Said relief holes 13 are incorporated into the design for ease in bending and flexing while assembling said decoy blank 10.

Said vertical slits 12 separate and define two wing portions 28 and 29 as well as a tail portion 16 of said decoy blank 10. At least two symmetrically placed holes 11 are incorporated into the design of the decoy blank 10 so as to allow for easy transformation from a land decoy to a buoyant decoy by inserting flotation devices 25 into symmetrically placed holes 11.

Said flotation devices 25 have located on either end, pin-like members 37 with groove-like indentations 38 which allow for engaging into symmetrically placed holes 11.

Figure 2:
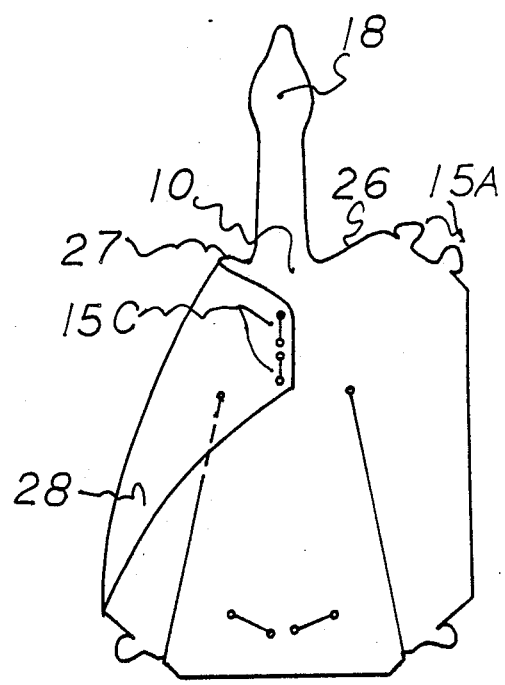
FIG. 2 is a decoy blank of the present invention being prepared for assembly of the chest area.
Figure 3:
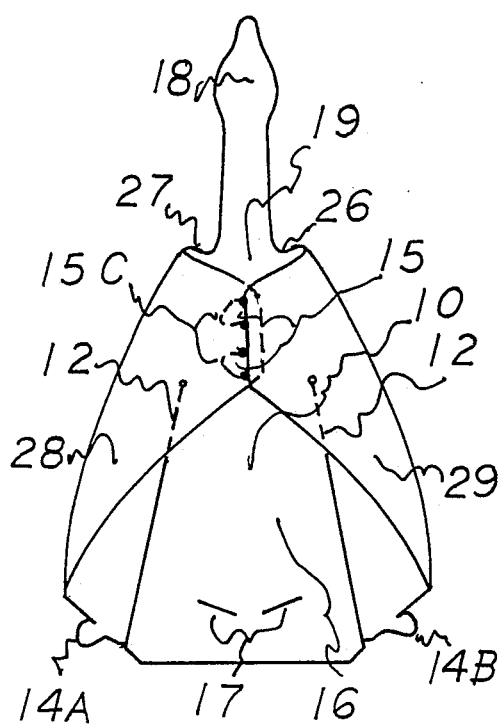
FIG. 3 is a decoy blank of the present invention of which the chest area of the decoy has been assembled leaving an opening in the chest area.
Figure 4:
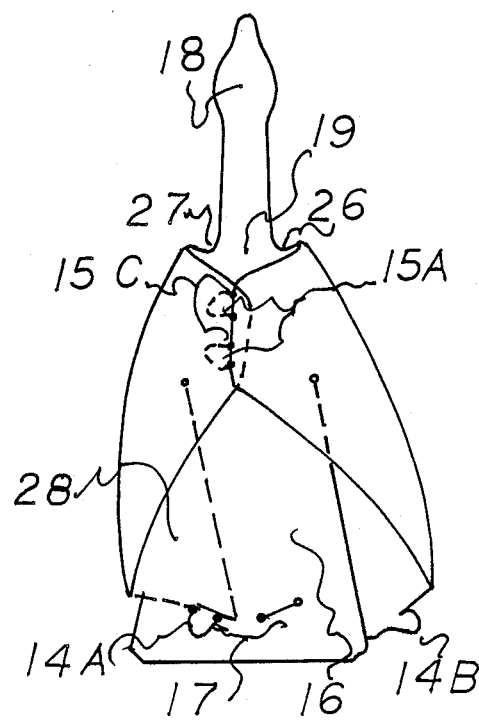
FIG. 4 shows partial wing area assembly of the decoy blank by using fastening means of the present invention.
Figure 5:
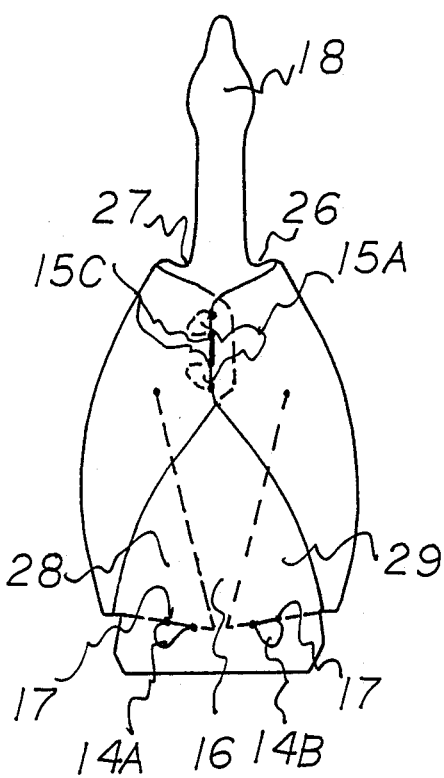
FIG. 5 illustrates the completed wing assembly and tail portion of the present invention.
Figure 6:
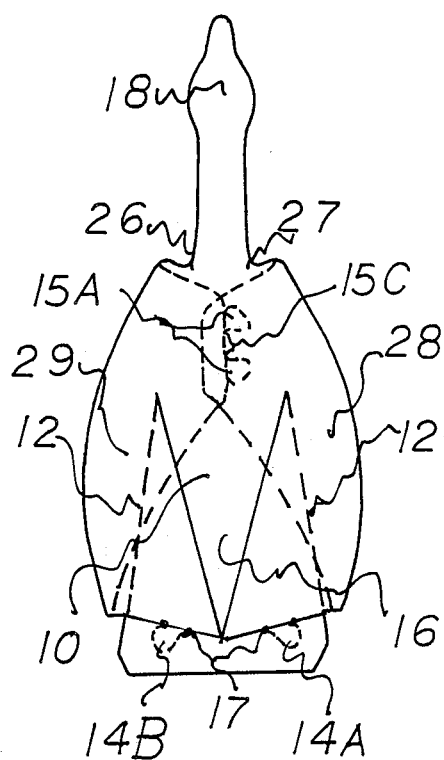
FIG. 6 is a top view of the assembled decoy of the present invention.

Turning to FIGS. 2 and 3, assembly of chest portion is illustrated by bending shoulder portion 26 toward center of decoy blank 10, while simultaneously bending other shoulder portion 27 toward the center of decoy blank 10 and fastening the dual tension retaining fasteners 15a to corresponding openings 15c.

Assembly of said chest area allows an opening 19 to remain between head portion 18 and assembled shoulder portions 26 and 27 for passage of wind when decoy is in use.

Wing portions 28 and 29 are assembled by fastening each wing portion 28 and 29 which also include tension retaining fasteners 14a and 14b to corresponding openings 17 in tail portion 16 of said decoy blank 10. Such assembly produces air guides along vertical slits 12 which aids in the production of aerodynamic movement of the decoy when in use.

Said decoy now assembled, turning now to FIG. 7, the mounting stake 30 is made from a light-weight, durable material such as PVC. One portion of said mounting stake 30 is a circular portion 32 with a longitudinal slit 31 equally dividing, but not separating circular portion 32 of said mounting stake 30. The longitudinal slit 31 allows for mounting decoy to the mounting stake 30 by sliding assembled chest portion of decoy into longitudinal slit 31 of mounting stake 30. Since decoys are faced into the wind, the wind itself helps secure decoy.

The second portion of mounting stake 30 is a non-circular cross-section 33 which adjoins circular portion 32 of mounting stake 30, thus demonstrating a monolithic structure of two different configurations. Non-circular cross-section 33 has a pointed end for ground penetration.

Figure 9A:
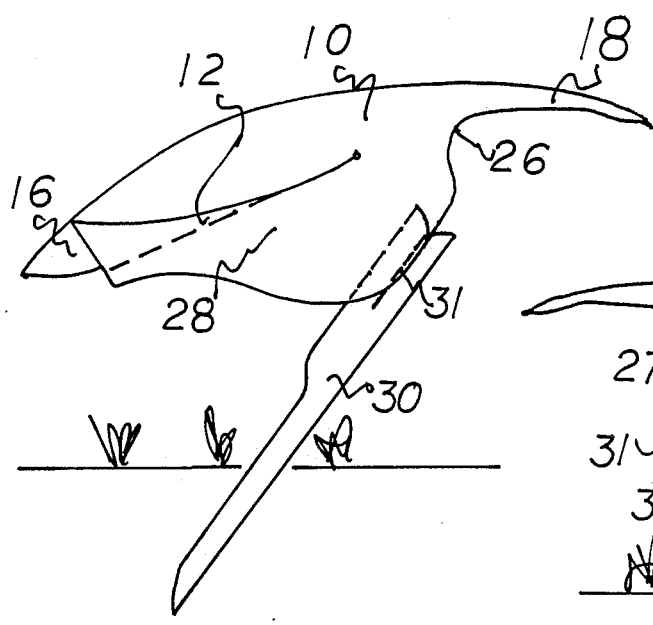
FIGS. 9A and 9B are illustrations of the decoy of the present invention attached to said mounting stake.
Figure 9B:
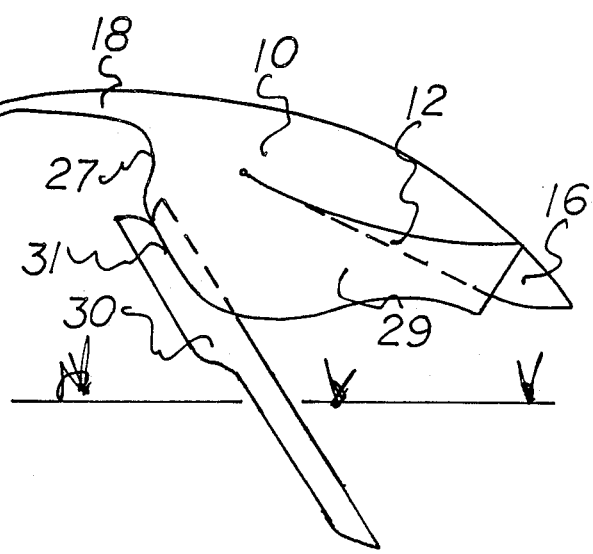
Figure 10:
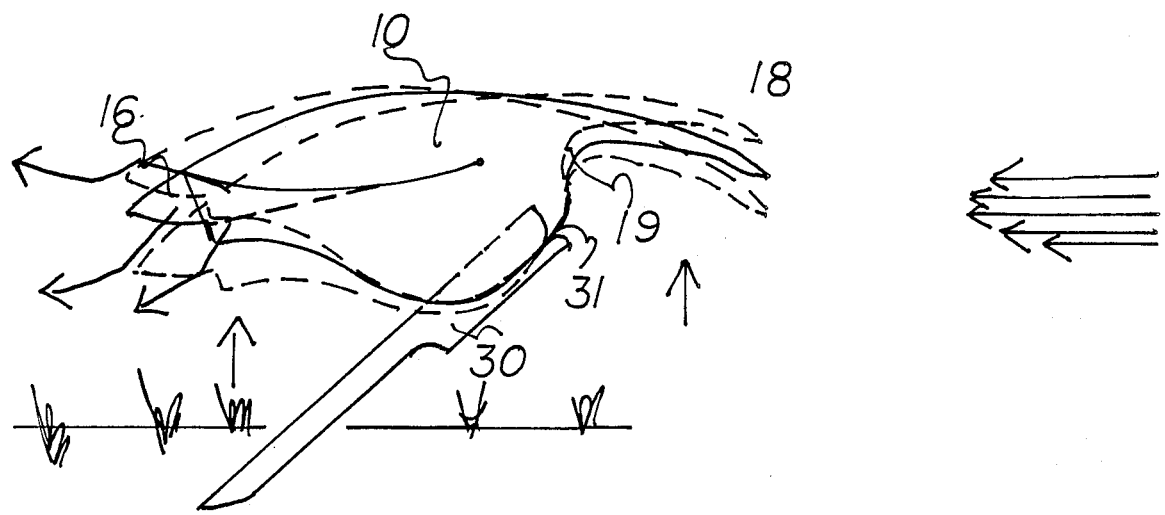
FIG. 10 illustrates the reaction of the decoy when subjected to a breeze which passes through the chest opening, follows along the air guides and flows out the back end of the decoy.
Figure 11:
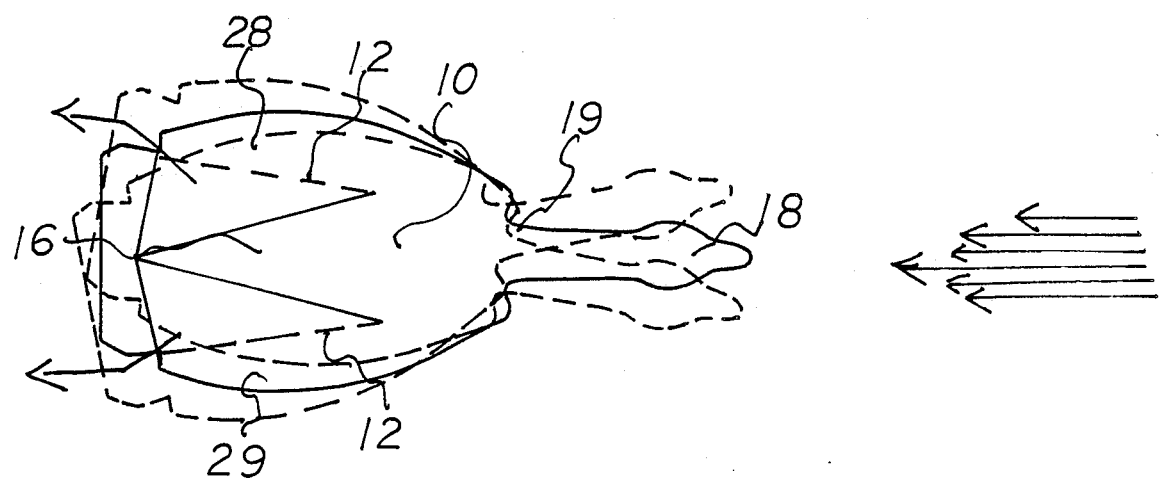
FIG. 11 is a top view of the decoy of the present invention which illustrates the side to side movement achieved when exposed to a breeze.

FIG. 9 illustrates an assembled decoy on mounting stake 30. FIG. 10 illustrates an assembled decoy on mounting stake 30 reacting to wind movement. Decoy is faced into the wind; as wind enters through chest opening 19, wind channels along air guides 12 and finally expels out back of decoy on either side of tail portion 16, causing a side to side or walking movement.

Figure 12:
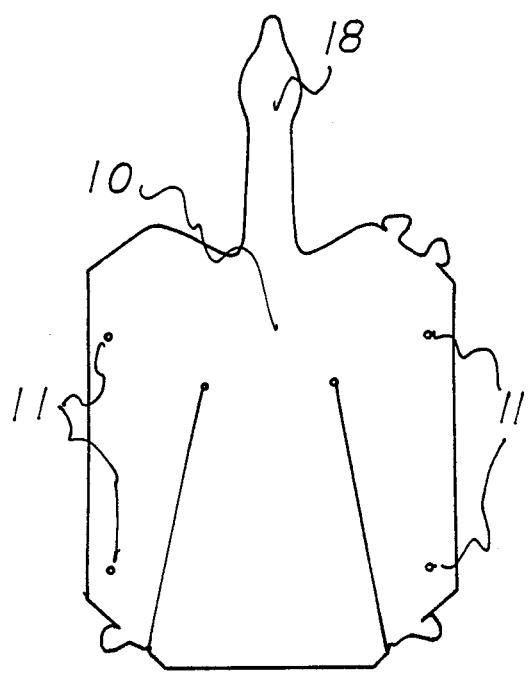
FIG. 12 shows the decoy blank of the present invention with symmetrically placed holes for the insertion of flotation devices as well as an illustration of the preferred flotation devices.
Figure 13:
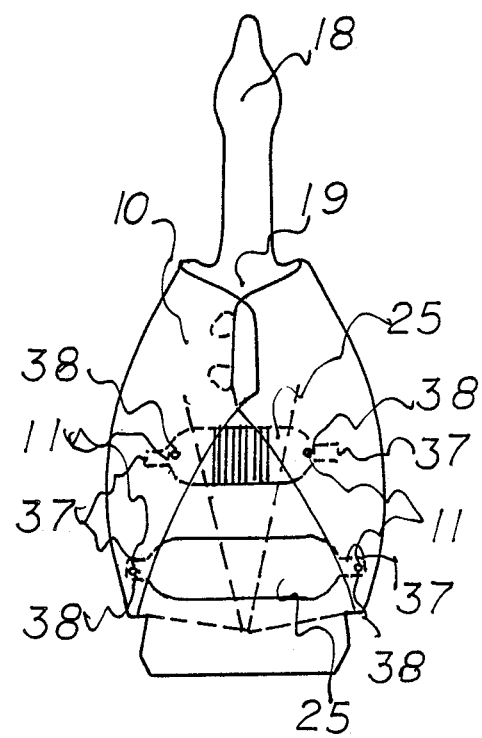
FIG. 13 is a bottom view of the assembly of a decoy blank showing insertion of the flotation device.
Figure 14:
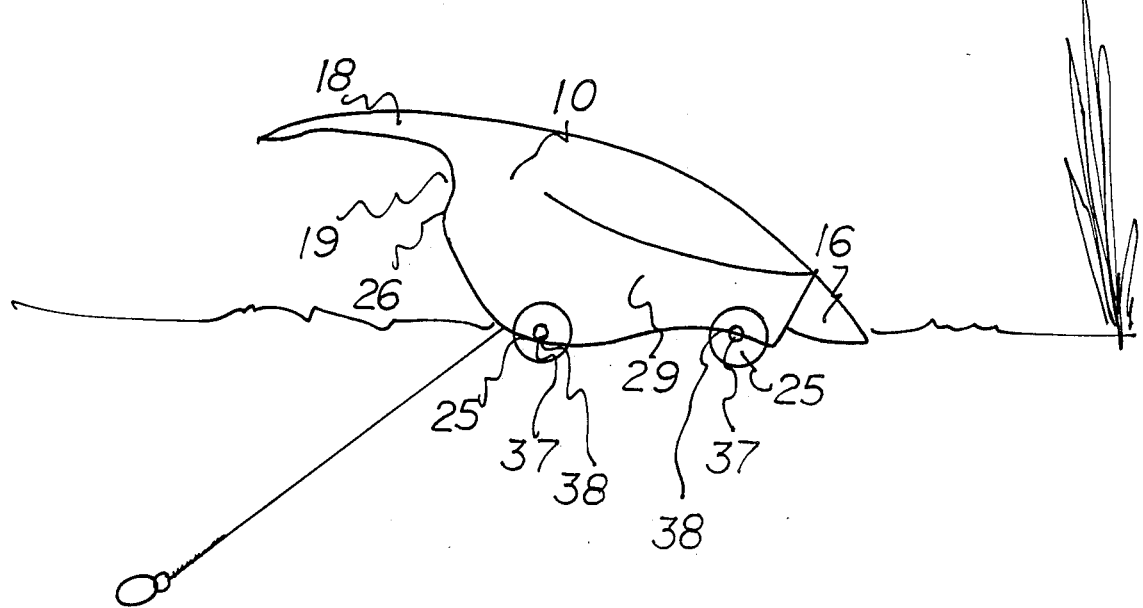
FIG. 14 illustrative side view of the assembly decoy using flotation device in water.

FIG. 12 illustrates symmetrically placed holes 11 in decoy blank 10 and corresponding flotation devices 25 which includes pins 37 or the like for insertion of flotation devices 25 into symmetrically placed holes 11. Flotation devices 25 are preferably made of polystyrene material for buoyancy. Pins 37 include a groove-like indentation 38 for securing and engaging into symmetrically placed holes 11.

The foregoing description of the invention has been directed to a particular preferred embodiment of the present invention for purposes of explanation and illustration. It will be apparent to those skilled in the art that many modifications and changes in the decoy may be made without departing from the scope and spirit of the invention. It is, therefore, intended that the following claims cover such modifications and changes:

What I claim is:

1. An aerodynamically designed wild game decoy of a monolithical structure which may be formed from a flat sheet of element resistant, light-weight, durable material into a decoy that may be easily transported in assembled state that when faced into wind, simulates real wild game bird movement comprising
   a one-dimensional, flat head portion resembling the shape of a wild game bird,
   shoulder portions of which one shoulder portion including at least one tension retaining fastener,
   the other or opposite shoulder portion including a corresponding opening to allow for assembly engagement of both said shoulder portions to form a chest portion of said aerodynamically designed wild game decoy, said assembly forming an opening below said head portion for wind passage, and
   two vertical slits emanating from above center of said monolithical structure which separate and define two wing portions and a tail portion of said decoy having relief holes symmetrically placed at base or beginning points of said vertical slits, at such points for said relief holes to allow transforming of said element resisting, light-weight, durable material into definite said wing portions and said tail portion,
   said wing portions having at least one tension retaining fastener and,
   said tail portion having an equal amount of corresponding openings with relief holes on either end of said openings for the engagement of said tension retaining fasteners to said openings with said relief holes,
   said decoy having at least two holes symmetrically placed on either side of said decoy in such area and size as to allow for insertion of a flotation device,
   said flotation device may be of polystyrene or other buoyant material of an oblong or such shape having pins of such size and shape as to cooperate with said holes symmetrically placed on either side of said decoy,
   said pins or the like having groove-like indentations as to allow for engaging and fastening of said flotation device to said symmetrically placed holes.

2. A mounting stake to be used in combination with said aerodynamically designed wild game decoy of claim 1 comprising
   a monolithical structure of a partial circular section of light-weight, durable material having a longitudinal slit equally dividing but not separating said partial circular section to be used for mounting said decoy and,
   a partial non-circular cross-section adjoining said partial circular section with a pointed end on said partial non-circular cross-section for ground penetration.

* * * * *